United States Patent
Yang et al.

(10) Patent No.: US 7,450,736 B2
(45) Date of Patent: Nov. 11, 2008

(54) MONOCULAR TRACKING OF 3D HUMAN MOTION WITH A COORDINATED MIXTURE OF FACTOR ANALYZERS

(75) Inventors: Ming-Hsuan Yang, Sunnyvale, CA (US); Rui Li, Boston, MA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/553,382

(22) Filed: Oct. 26, 2006

(65) Prior Publication Data
US 2007/0104351 A1    May 10, 2007

Related U.S. Application Data

(60) Provisional application No. 60/731,399, filed on Oct. 28, 2005.

(51) Int. Cl.
*G06K 9/00* (2006.01)
(52) U.S. Cl. .................. 382/103; 382/285; 345/474
(58) Field of Classification Search .......... 382/103, 382/106, 115–118, 154, 168, 181, 184, 190, 382/194, 201, 203, 209, 219, 232, 260, 274, 382/276, 285, 107, 305, 312; 356/614; 700/98, 700/29; 345/473, 474; 354/1, 17
See application file for complete search history.

(56) References Cited

U.S. PATENT DOCUMENTS

| | | | |
|---|---|---|---|
| 6,115,052 A * | 9/2000 | Freeman et al. ............. 345/473 |
| 6,240,198 B1 | 5/2001 | Rehg et al. | |
| 6,256,418 B1 | 7/2001 | Rehg et al. | |
| 6,269,172 B1 | 7/2001 | Rehg et al. | |
| 6,301,370 B1 * | 10/2001 | Steffens et al. ............. 382/103 |
| 6,591,146 B1 * | 7/2003 | Pavlovic et al. ............. 700/29 |
| 7,148,972 B2 * | 12/2006 | Rekimoto .................. 356/614 |
| 7,167,578 B2 * | 1/2007 | Blake et al. ................ 382/103 |
| 7,239,929 B2 * | 7/2007 | Ulrich et al. ................ 700/98 |
| 7,257,237 B1 * | 8/2007 | Luck et al. ................. 382/103 |

OTHER PUBLICATIONS

Urtasun, R., et al., "Priors for People Tracking from Small Training Sets," Proceedings of the 10 th IEEE International Conference on Computer Vision (ICCV), 2005, pp. 403-410.*

(Continued)

*Primary Examiner*—Seyed Azarian
(74) *Attorney, Agent, or Firm*—Fenwick & West LLP; Mark Duell

(57) ABSTRACT

Disclosed is a method and system for efficiently and accurately tracking three-dimensional (3D) human motion from a two-dimensional (2D) video sequence, even when self-occlusion, motion blur and large limb movements occur. In an offline learning stage, 3D motion capture data is acquired and a prediction model is generated based on the learned motions. A mixture of factor analyzers acts as local dimensionality reducers. Clusters of factor analyzers formed within a globally coordinated low-dimensional space makes it possible to perform multiple hypothesis tracking based on the distribution modes. In the online tracking stage, 3D tracking is performed without requiring any special equipment, clothing, or markers. Instead, motion is tracked in the dimensionality reduced state based on a monocular video sequence.

27 Claims, 7 Drawing Sheets

OTHER PUBLICATIONS

Howe, N. R., et al., "Bayesian Reconstruction of 3D Human Motion from Single-Camera Video," Neural Information Processing Systems, 1999, 7 Pages, [online] [retrieved on Nov. 27, 2006] Retrieved from the Internet: <URL:www.ai.mit.edu/people/leventon/Research/9912-NIPS/paper.pdf>.

Belkin, M., et al., "Laplacian Eigenmaps and Spectral Techniques for Embedding and Clustering," Advances in Neural Information Processing Systems (NPIS), 2001, pp. 585-591.

Brand, M., "Charting a Manifold," Proceedings, Neural Information Processing Systems (NIPS), Dec. 2002, pp. 961-968, vol. 15.

Cham, T., et al., "A Multiple Hypothesis Approach to Figure Tracking," Proceedings of the IEEE Conference on Computer Vision and Pattern Recognition (CVPR), Jun. 1999, pp. 239-245.

Elgammal, A., et al., "Inferring 3D Body Pose from Silhouettes Using Activity Manifold Learning," Proceedings of the IEEE Conference on Computer Vision and Pattern Recognition (CVPR), 2004, pp. 681-688.

Ghahramani, Z., et al., "The EM Algorithm for Mixtures of Factor Analyzers," Technical Report CRG-TR-96-1, University of Toronto, May 21, 1996, pp. 1-8.

Grochow, K., et al., "Style-Based Inverse Kinematics," ACM Computer Graphics (SIGGRAPH), 2004, pp. 522-531.

Isard, M., et al., "Condensation—Conditional Density Propagation for Visual Tracking," International Journal of Computer Vision, (IJCV), 1998, pp. 5-28, vol. 29.

Lawrence, N. D., "Gaussian Process Latent Variable Models for Visualisation of High Dimensional Data," Proceedings, Neural Information Processing Systems (NIPS), 2003, 8 pages.

Roweis, S., et al., "Global Coordination of Local Linear Models," Proceedings, Neural Information Processing Systems (NIPS), 2001, pp. 889-896.

Roweis, S. T., et al., "Nonlinear Dimensionality Reduction by Locally Linear Embedding," Science, Dec. 22, 2000, pp. 2323-2326, vol. 290.

Safonova, A., et al., "Synthesizing Physically Realistic Human Motion in Low-Dimensional, Behavior-Specific Spaces," ACM Computer Graphics (SIGGRAPH), 2004, pp. 514-521.

Sidenbladh, H., et al., "Learning Image Statistics for Bayesian Tracking," Proceedings of the IEEE International Conference on Computer Vision (ICCV), Jul. 2001, pp. 709-716.

Sidenbladh, H., et al., "Stochastic Tracking of 3D Human Figures Using 2D Image Motion," Proceedings, Part II of the 6th European Conference on Computer Vision (ECCV), Jun./Jul. 2000, pp. 702-718.

Sigal, L., et al., "Tracking Loose-Limbed People," Proceedings of the IEEE Conference on Computer Vision and Pattern Recognition (CVPR), 2004, pp. 421-428.

Sminchisescu, C., et al., "Generative Modeling for Continuous Non-Linearly Embedded Visual Inference," Proceedings of the IEEE International Conference on Machine Learning, 2004, pp. 140-147.

Teh, Y. W., et al., "Automatic Alignment of Local Representations," Proceedings, Neural Information Processing Systems (NIPS), 2002, pp. 841-848.

Tenenbaum, J. B., et al., "A Global Geometric Framework for Nonlinear Dimensionality Reduction," Science, Dec. 22, 2000, pp. 2319-2323, vol. 290.

Tian, T., et al., "Tracking Human Body Pose on a Learned Smooth Space," Boston University Computer Science Technical Report No. 2005-029, Aug. 2005, pp. 1-8.

Toyama, K., et al., "Probabilistic Tracking in a Metric Space," Proceedings of the IEEE International Conference on Computer Vision (ICCV), 2001, 8 pages.

Urtasun, R., et al., "Priors for People Tracking from Small Training Sets," Proceedings of the 10th IEEE International Conference on Computer Vision (ICCV), 2005, pp. 403-410.

PCT International Search Report and Written Opinion, PCT/US/06/42135, Oct. 29, 2007, 10 pages.

* cited by examiner

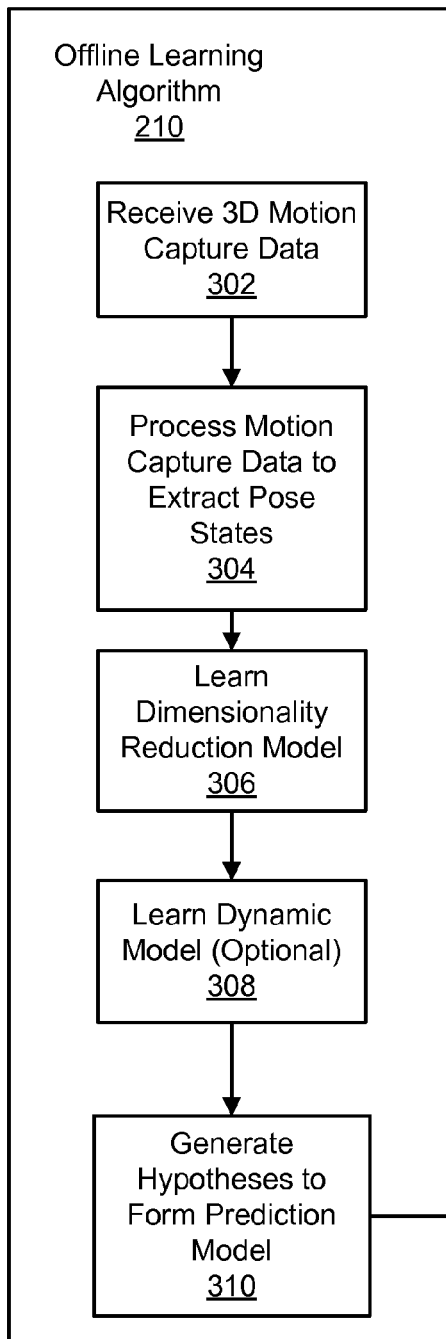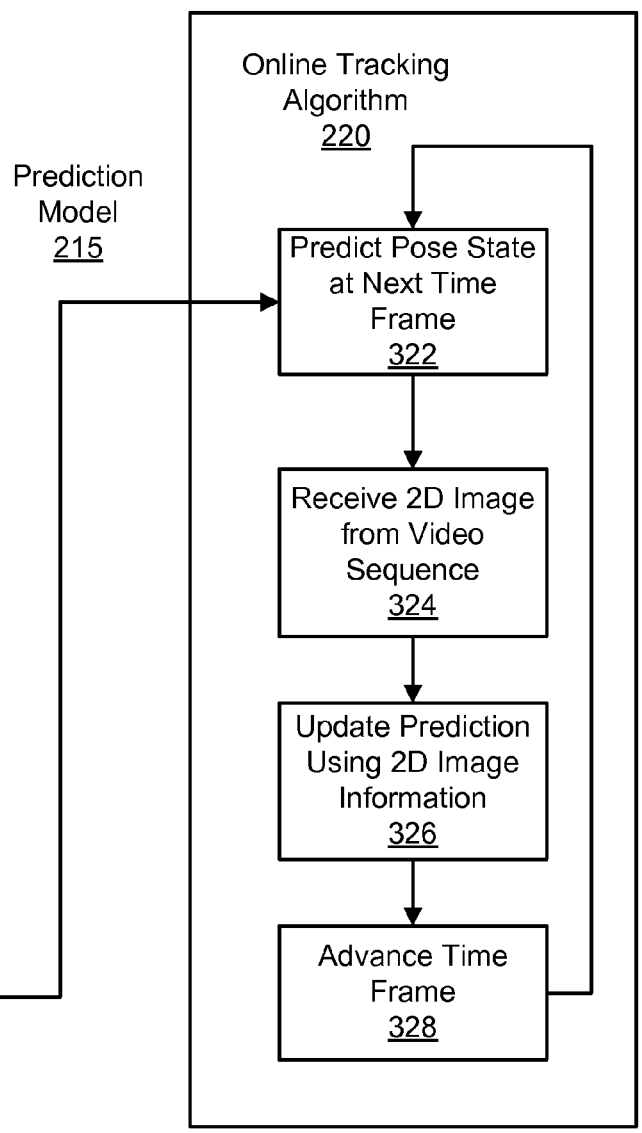
FIG. 3a
FIG. 3b

MONOCULAR TRACKING OF 3D HUMAN MOTION WITH A COORDINATED MIXTURE OF FACTOR ANALYZERS

RELATED APPLICATIONS

This application claims priority from U.S. provisional application No. 60/731,399 filed Oct. 28, 2005 entitled "Monocular Tracking of 3D Human Motion With a Coordinated Mixture of Factor Analyzers" which is incorporated by reference herein in their entirety.

FIELD OF THE INVENTION

The invention relates to tracking 3D human motion. More particularly, the invention relates to a system and method for tracking 3D articulated human motion in a dimensionality-reduced space given monocular video sequences.

BACKGROUND OF THE INVENTION

Tracking articulated human motion is of interest in numerous applications including video surveillance, gesture analysis, human computer interface, and computer animation. For example, in creating a sports video game it may be desirable to track the three-dimensional (3D) motions of an athlete in order to realistically animate the game's characters. In biomedical applications, 3D motion tracking is important in analyzing and solving problems relating to the movement of human joints. In traditional 3D motion tracking, subjects wear suits with special markers and perform motions recorded by complex 3D capture systems. However, such motion capture systems are expensive due to the required special equipment and significant studio time. Further, conventional 3D motion capture systems require considerable post-processing work which adds to the time and cost associated with traditional 3D tracking methods.

Various tracking algorithms have been proposed that require neither special clothing nor markers. A number of algorithms track body motion in the two-dimensional (2D) image plane, thereby avoiding the need for complex 3D models or camera calibration information. However, many conventional methods are only able to infer 2D joint locations and angles. As a result, many traditional 2D methods have difficulty in handling occlusions and are inutile for applications where accurate 3D information is required.

3D tracking algorithms based on 2D image sequences have been proposed but depend on detailed 3D articulated models requiring significantly more degrees of freedom. Particularly, particle filtering methods have been applied widely in tracking applications. However, these algorithms have conventionally been inefficient due to the high dimensionality of the pose state space. The number of particles needed to sufficiently approximate the state posterior distribution means that significant memory and processing power is required for implementation.

Several attempts have previously been made to develop particle filtering techniques in a reduced state space to ease memory and processing requirements. These efforts have largely failed to result in accurate tracking methods. Specifically, the proposed algorithms tend to fail when large limb movements occur over time.

What is needed is an efficient and accurate algorithm for tracking 3D articulated human motion given monocular video sequences.

SUMMARY OF THE INVENTION

The present invention provides a method for efficiently and accurately tracking 3D human motion from a 2D video sequence, even when self-occlusion, motion blur and large limb movements occur. In an offline learning stage, 3D motion capture data is acquired using conventional techniques. A prediction model is then generated based on the learned motions. In the online stage, 3D tracking is performed without requiring any special equipment, clothing, or markers. Instead, 3D motion can be tracked from a monocular video sequence based on the prediction model generated in the offline stage.

In order to overcome the problem of high dimensionality associated with traditional particle filtering, the motion is tracked in a dimensionality-reduced state. Human motion is limited by many physical constraints resulting from the limited angles and positions of joints. By exploiting these physical constraints, a low-dimensional latent model can be derived from the high-dimensional motion capture data. A probabilistic algorithm performs non-linear dimensionality reduction to reduce the size of the original pose state space. During off-line training, a mixture of factor analyzers is learned. Each factor analyzer can be thought of as a local dimensionality reducer that locally approximates the pose state. Global coordination between local factor analyzers is achieved by learning a set of linear mixture functions that enforces agreement between local factor analyzers. The formulation allows easy bidirectional mapping between the original body pose space and the low-dimensional space.

The projected data forms clusters within the globally coordinated low-dimensional space. This makes it possible to derive a multiple hypothesis tracking algorithm based on the distribution modes. By tracking in the low-dimensional space, particle filtering is faster because significantly fewer particles are required to adequately approximate the state space posterior distribution. Given clusters formed in the latent space, temporal smoothness is only enforced within each cluster. Thus, the system can accurately track large movements of the human limbs in adjacent time steps by propagating each cluster's information over time.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 3a is an offline learning algorithm for generating a prediction model used in 3D motion tracking.

FIG. 3b is an online tracking algorithm for tracking 3D human motion given a monocular video sequence and the prediction model generated in the offline learning stage.

DETAILED DESCRIPTION OF THE INVENTION

Figure 1:
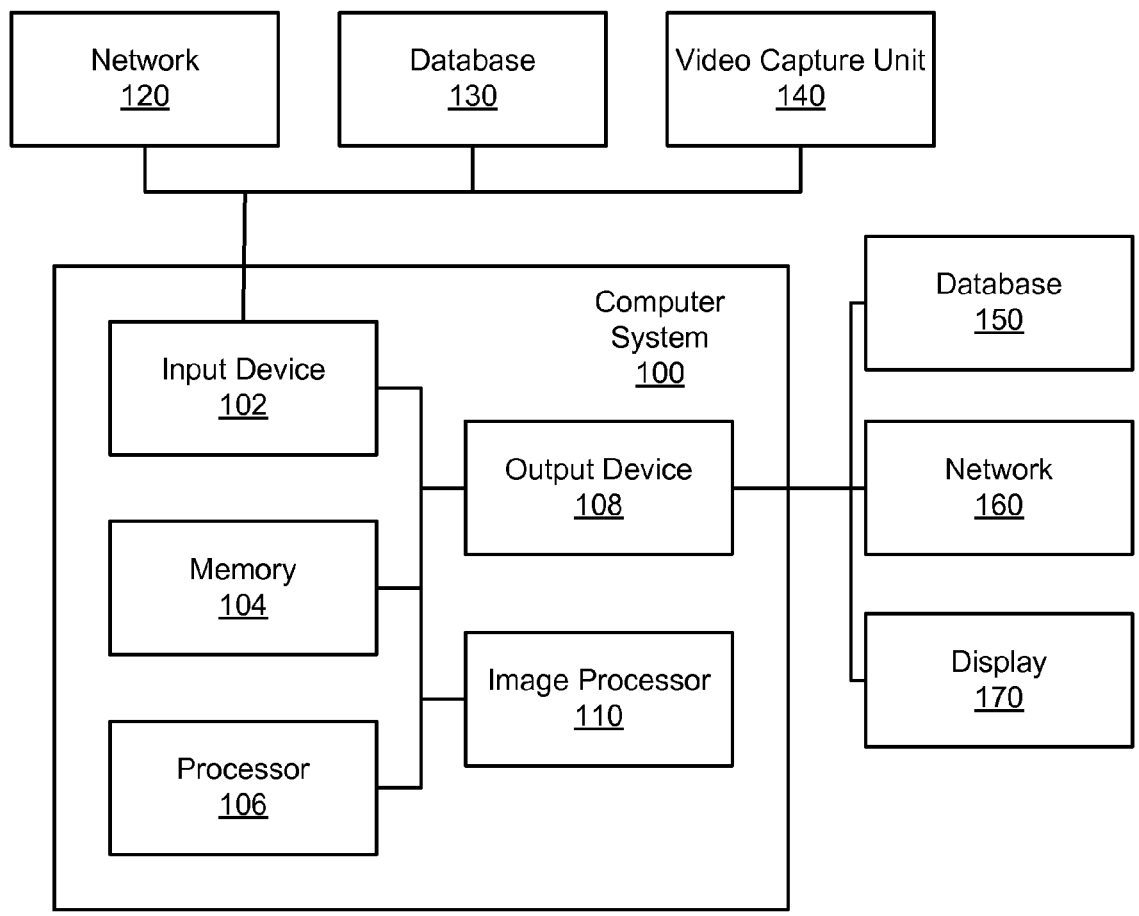
FIG. 1 is an example computer system for executing the methods of the present invention.

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1 is a computer system according to one embodiment of the present invention. The computer system 100 comprises an input device 102, a memory 104, a processor 106, an output device 108, and an image processor 110. The input device 102 is coupled to a network 120, a database 130, and a video capture unit 140. The output device 108 is coupled to a database 150, a network 160, and a display 170. In other embodiments, the input device is connected to only one or two of a network 120, a database 130, and a video capture unit 140. In yet another embodiment, the input device may be connected to any device configured to input data to the computer system. Similarly, in some embodiments, the output device may be connected to one or more of a database 150, network 160, display 170 or any other device cable of receiving outputted data. In another embodiment, the computer system comprises one or more of a processor 106, an image processor 110, or other specialized processor.

Figure 2:
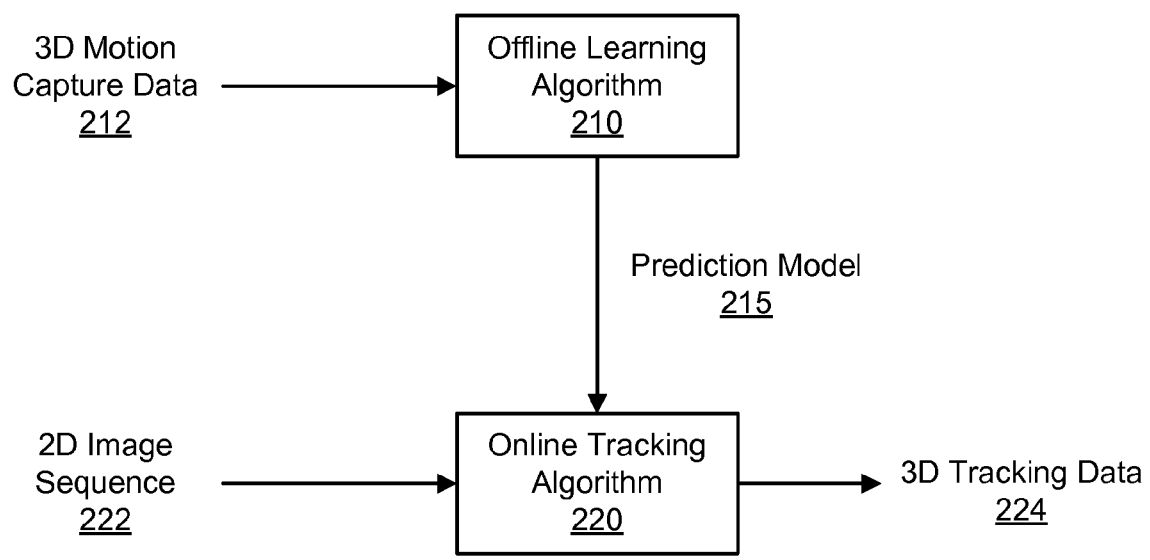
FIG. 2 is a block diagram illustrating one embodiment of the present invention.

FIG. 2 is a block diagram illustrating one embodiment of the present invention. The embodiment comprises an offline learning algorithm 210 and an online tracking algorithm 220. The offline learning algorithm 210 uses 3D motion capture data 212 to produce a prediction model 215 utilized by the online tracking algorithm 220. The online tracking algorithm 220 uses a 2D image sequence 222 and the prediction model 215 to generate the 3D tracking data 224.

3D motion capture data 212 may be acquired by a variety of conventional techniques during the offline stage. In one embodiment, a subject wears a special suit with trackable markers and performs motions captured by video cameras. The subject may perform a series of different motions which are captured and processed. In addition, 3D motion capture data may be acquired from multiple subjects performing similar sets of motions. This provides statistical data from which the prediction model 215 can be derived.

FIG. 3a summarizes one embodiment of the offline learning algorithm 210. A computer system 100 receives 302 3D motion capture data 212. The pose state is then extracted 304 from the 3D motion capture data. The unfiltered pose state resides in a high dimensional state space and it is desirable to reduce the dimensionality of the state space to decrease memory requirements and increase processing efficiency. A dimensionality reduction model is learned 306 to reduce the dimensionality of the pose state from a high dimensional space to a low dimensional space. Optionally, a dynamic model is learned 308. The dynamic model, if learned, may optimize the prediction model 215 for more efficient tracking. The prediction model 215 is formed by generating 310 hypotheses based on the dimensionality reduction model and in some embodiments, the learned dynamic model.

The motion capture data 212 may be received from a video capture unit 140 interfaced to an input device 102 of a computer system 100. In other embodiments, the 3D motion capture data 212 may be received by the input device 102 from a database 130 or through a network 120. The 3D motion capture data 212 is processed by the computer system 100 to extract 304 the pose states. The pose states comprise data which completely represent the positions of the subject throughout a motion. In one preferred embodiment of the present invention, the extracted pose state comprises a vector of joint angles. However, the pose state may comprise any set of data that completely describes the pose. This may include angles, positions, velocities, or accelerations of joints, limbs, or other body parts or points of interest. Any number of conventional techniques may be used to extract 304 the pose states from the raw motion capture data 212.

The 3D motion capture data 212 may be processed by a standard computer processor 106 or by a specialized image processor 110, for example. In addition, the pose state may be stored in memory 104 or outputted by an output device 108. The output device 108 interfaces to an external database 150 for storage or sends the data to a network 160 or a display 170.

A dimensionality reduction model is learned 306 based on the extracted pose states. The dimensionality reduction model takes advantage of the physical constraints of human motion to generate a low-dimensional latent model from high-dimensional motion capture data. Many algorithms for dimensionality reduction are known including Principal Component Analysis (PCA), Locally Linear Embedding (LLE) described in Roweis, et al., *Nonlinear Dimensionality Reduction by Locally Linear Embedding*, Science 290, 2000, 2323-2326; Isomap described in Tenenbaum, et al., *A Global Geometric Framework for Nonlinear Dimensionality Reduction*, Science 290, 2000, 2319-2323; and Laplacian Eigenmaps described in Belkin, et al., *Laplacian Eigenmaps and Spectral Techniques for Embedding and Clustering*, Advances in Neural Information Processing Systems (NIPS), 2001, 585-591 all of which are incorporated by reference herein in their entirety. These conventional techniques are capable of handling non-linear behavior inherent to 3D human motion, but are typically not invertible. In one embodiment, regression methods (such as Radial Bases Function, for example) are used to learn the mapping back from the low dimensional space to the high dimensional space.

In a preferred embodiment, an invertible dimensionality reduction method is used. Inverse mapping of particles back to the original human pose space allows for re-weighting of the particles given the image measurements during online tracking without using a regression method. Examples of dimensionality reduction techniques that provide inverse mapping include Charting described in Brand, *Charting a Manifold*, NIPS, 2001, 961-968; Locally Linear Coordination (LLC) described in Teh, et al., *Automatic Alignment of Local Representations*, NIPS, 2002, 841-848; and Gaussian Process Latent Variable Model (GPLVM) described in Lawrence, *Gaussian Process Models for Visualization of High Dimensional Data*, NIPS, 2003 all of which are incorporated by reference herein in their entirety.

In one embodiment, the dimensionality reduction model is based on an LLC algorithm. In this embodiment, a probabilistic algorithm is employed to perform non-linear dimensionality reduction and clustering concurrently within a global coordinate system. The projected data forms clusters within the globally coordinated low-dimensional space. A mixture of factor analyzers is learned with each factor analyzer acting as a local dimensionality reducer. In an alternate embodiment, a GPLVM algorithm or other dimensionality reduction algorithm is used.

A model which performs a global coordination of local coordinate systems in a mixture of factor analyzers (MFA) is known is the art, for example, in Roweis, et al. *Global Coordination of Local Linear Models*, NIPS, 2001, 889-896 which is incorporated by reference herein in its entirety. Each factor analyzer (FA) can be regarded as a local dimensionality reducer. Both the high-dimensional data y and its global coordinate g are generated from the same set of latent variables s and $z_s$, where each discrete hidden variable s refers to the s-th FA and each continuous hidden variable $z_s$ represents the low-dimensional local coordinates in the s-th FA. In the MFA model, data generated from s-th FA with prior probability P(s), and the distribution of $z_s$ are Gaussian: $z_s|s \sim N(0, I)$ where I is the identity matrix. Given s and $z_s$, y and the global coordinate g are generated by the following linear equations $$y = T_{L_s} z_s + \mu_s + u_s$$

$$g = T_{G_s} z_s + \kappa_s + v_s \quad (1)$$

where $T_{Ls}$ and $T_{Gs}$ are the transformation matrices, $\mu_s$ and $\kappa_s$ are uniform translations between the coordinate systems, $u_s \sim N(0, \Lambda_{u_s})$ and $v_s \sim N(0, \Lambda_{v_s})$ are independent zero mean Gaussian noise terms. The following probability distributions can be derived from Eq. 1:

$$y|s, z_s \sim N(T_{L_s} z_s + \mu_s, \Lambda_{u_s})$$

$$g|s, z_s \sim N(T_{G_s} z_s + \kappa_s, \Lambda_{v_s}) \quad (2)$$

With $z_s$ being integrated out, the equation is $$y|s \sim N(\mu_s, \Lambda_{u_s} + T_{L_s} T^T_{L_s})$$

$$g|s \sim N(\kappa_s, \Lambda_{v_s} + T_{G_s} T^T_{G_s}) \quad (3)$$

The inference of global coordinate g conditioned on a data point $y_n$ can be rewritten as $$p(g|y_n) = \sum_s p(g|y_n, s) p(s|y_n), \quad (4)$$

where $$p(g|y_n, s) = \int p(g|s, z_s) p(z_s|s, y_n) dz_s \quad (5)$$

Given Eq. 1, both $p(g|s, z_s)$ and $p(z_s|s, y_n)$ are Gaussian distributions, $p(g|y_n,s)$ also follows a Gaussian distribution. Since $p(s|y_n) \propto p(y_n|s)p(s)$ can be computed and viewed as a weight, $p(g|y_n)$ is essentially a mixture of Gaussians.

Figure 4:
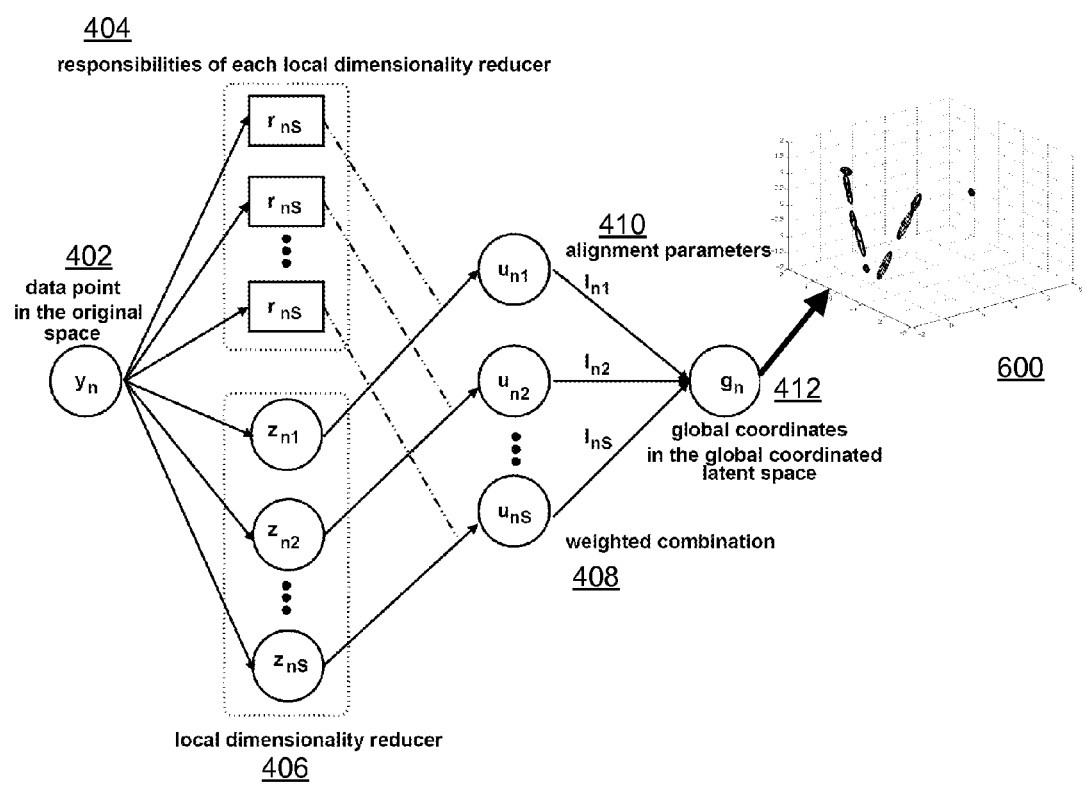
FIG. 4 is a dimensionality reduction algorithm according to one embodiment of the present invention.

In one embodiment, an efficient two stage learning algorithm leverages on the mixture of local models to collapse large groups of points together as described by Teh, et al. referenced above. This algorithm works with the groups rather than individual data points in the global coordination. A graphical representation of the two stage dimensionality reduction model is depicted in FIG. 4. A data point in the original space, $y_n$ 402 is characterized by S factor analyzers.

First the MFA between y 402 and (s, $z_s$) 406 is learned using the method set forth in Ghahramani, et al., *The EM Algorithm for Mixtures of Factor Analyzers*, Technical Report CRG-TR-96-1, University of Toronto, 1996 which is incorporated by reference herein in its entirety. Given the learned MFA model, $z_{ns}$ 406 is the expected local coordinate in the s-th FA for each data point $y_n$. $r_{ns}$ 404 denotes the likelihood, $p(y_n|s)$. The set of $z_n$ 406 acts as a local dimensionality reducer while the set of $r_n$ 404 gives the responsibilities of each local dimensionality reducer. The weighted combination, $u_n$ 408 is formed from $r_n$ and $z_n$ as $$u_n^T = [r_{n_1} z_{n_1}^T, r_{n_1}, r_{n_2} z_{n_2}^T, r_{n_2}, \ldots, r_{n_s} z_{n_s}^T, r_{n_s}]$$

Then from Eqs. 1 and 2, $g_n$ 412, the expected global coordinate of $y_n$ 402 is defined as:

$$g_n = \sum_s r_{n_s}(T_{G_s} z_{n_s} + \kappa_s) = L u_n \quad (6)$$

where $$L = [T_{G_1}, \kappa_1, T_{G_2}, \kappa_2 \ldots, T_{G_s}, \kappa_s]$$

The alignment parameters L 410 provide the mapping from the weighted combination, $u_n$ 408 to the global coordinates, $g_n$, 412 in the global coordinated latent space from Eq. 6. Let $G = [g_1, g_2, \ldots, g_N]^T$ be the global coordinates of the whole data set (the rows of G corresponding to the coordinated data points) and $U = [u_1, u_2, \ldots, u_N]^T$. This yields a compact representation G=UL. To determine L, a cost function must be minimized that incorporates the topological constraints that govern $g_n$. In one embodiment, the cost function is based on LLE as described by Roweis in *Nonlinear Dimensionality Reduction by Locally Linear Embedding* referenced above.

Figure 5:
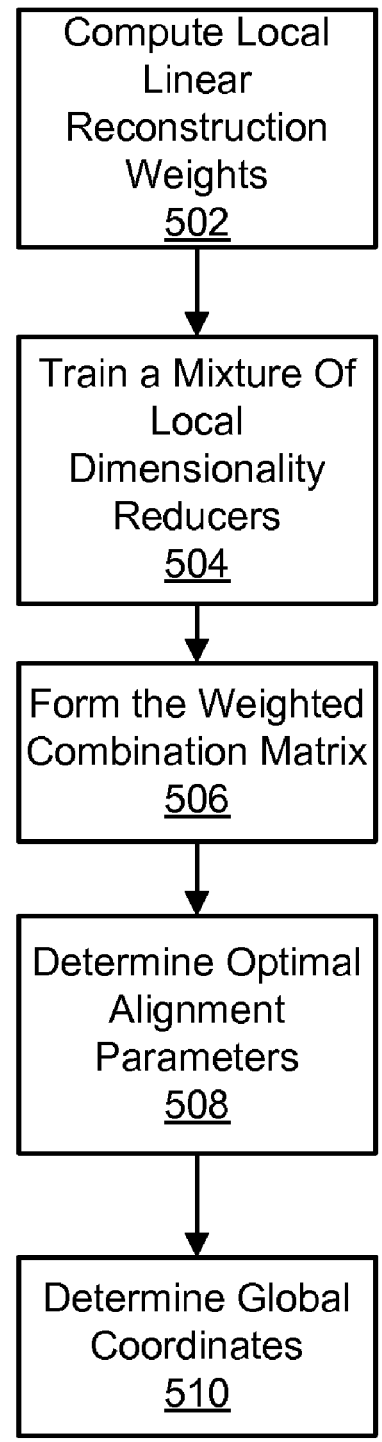
FIG. 5 is a block diagram illustrating a learning process for a dimensionality reduction model.

FIG. 5 represents an embodiment of a method for learning 306 a dimensionality reduction model which computes the alignment parameters, L, and the global coordinates, G. Local linear construction weights are first computed 502. Next, a mixture of factor analyzers are trained 504 as local dimensionality reducers. The local linear construction weights are combined to form 506 the weighted combination matrix. Optimal alignment parameters are determined 508 to map the weighted combination matrix to the global coordinate system. The global coordinates are determined 510 from the weighted combination matrix and alignment parameters.

The local linear reconstruction weights are computed 502 using equation 7 and as described below. For each data point $y_n$, its nearest neighbors are denoted as $y_m$ (m $\in$ $N_n$) and following is minimized:

$$\xi(Y, W) = \sum_n \left\| y_n - \sum_{m \in N_n} w_{nm} y_m \right\|^2 \quad (7)$$
$$= Tr(Y^T(I - W^T)(I - W)Y),$$

with respect to W and subject to the constraint $\Sigma m \in N_n$ $w_{nm} = 1$. Here the set of training data points is $Y = [y_1, y_2, \ldots, y_N]^T$ where each row of Y corresponds to a training data point. The weights $w_{nm}$ are unique and can be obtained via constrained least squares. These weights represent the locally linear relationships between $y_n$ and its neighbors.

The matrix U is formed 506 by a mixture of factor analyzers as described above and the matrices A and B are computed from Eq. 8-10 set forth below.

For this calculation, the following cost function is defined:

$$\xi(G, W) = \sum_n \left\| g_n - \sum_{m \in N_n} g_m \right\|^2 \quad (8)$$
$$= Tr(G^T(I - W^T)(I - W)G)$$
$$= Tr(L^T A L),$$

where $A = U(I-W^T)(I-W)U^T$. To ensure G is invariant to translations, rotations and scaling, the following constraints are defined, $$\frac{1}{N} \sum_n g_n = 0 \quad \text{and} \quad (9)$$

$$\frac{1}{N} \sum_n g_n g_n^T = \frac{1}{N} G^T G = L^T B L = I, \quad (10)$$

where I is the identity matrix and $B = 1/N U^T U$. Both the cost function (Eq. 8) and the constraints (Eq. 10) are quadratic and the optimal alignment parameters, L, is determined 408 by solving a generalized eigenvalue problem. Let d<<D be the dimensionality of the underlying manifold that y is generated from. In one example embodiment, D may typically be around 50 and d may typically have a value around 3. However, these values may vary depending on the specific problem of interest. The $2^{nd}$ to $(d+1)^{th}$ smallest generalized vectors solved from $Av = \lambda Bv$ form the columns of L. The global coordinates are then determined 510 from G=UL.

Figure 6:
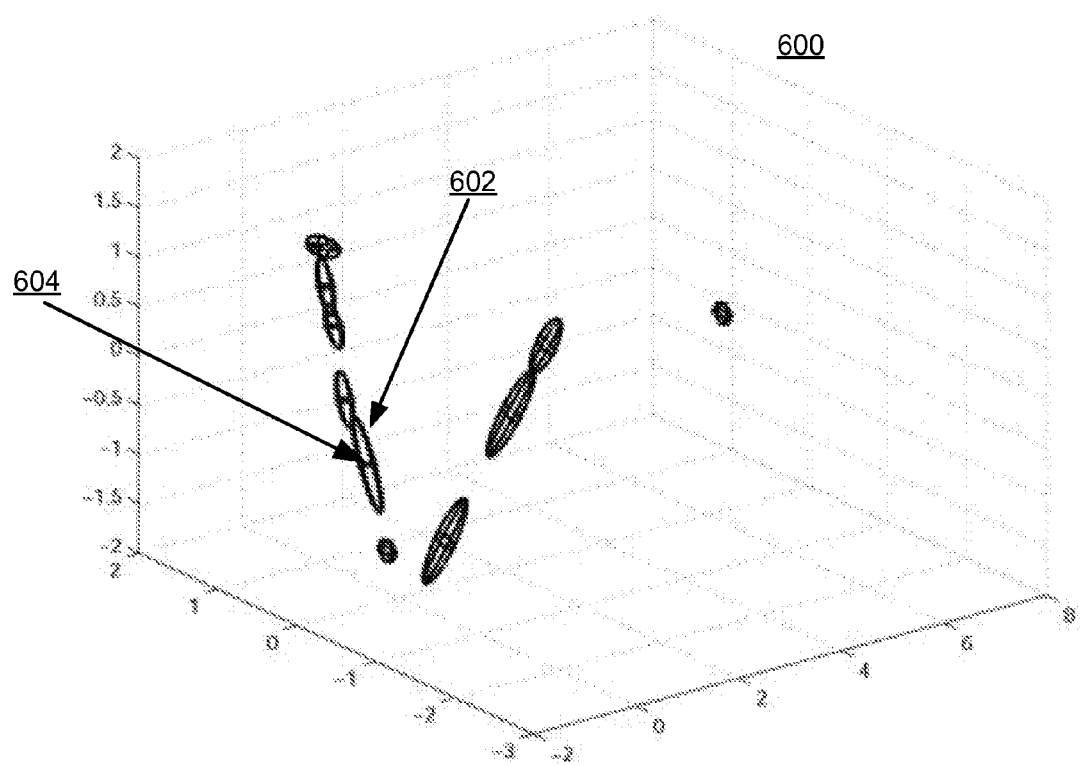
FIG. 6 illustrates clustering in a low dimensional space as a result of the dimensionality reduction algorithm.

Through the two stage learning process described above, clusters are obtained in the globally coordinated latent space 600 as illustrated in FIG. 6. Each cluster is modeled as a Gaussian distribution in the latent space with its own mean vector and covariance matrix. Each ellipsoid 602 represents a cluster in the latent space 600, where the mean of the cluster is the centroid 604 and the covariances are the axes of the ellipsoids 602. This cluster-based representation leads to a straightforward algorithm for multiple hypothesis tracking.

Referring back to FIG. 3, a dynamic model is optionally learned 308 for specific motions to be tracked. The dynamic model predicts how individual particles move over time. In one embodiment, a different dynamic model may be learned for each motion. Learning the dynamic model 308 optimizes the prediction model and allows for more accurate tracking and reduced computation for a specific motion of interest. However, successful tracking is also possible without learning the dynamic model. Thus, in some embodiments, this step is skipped. In one embodiment, a random walk model is used in place of a learned dynamic model. This model is more generic and can be applied to track arbitrary motions.

The online tracking algorithm 220 tracks a pose state in 3D by utilizing a modified multiple hypothesis tracking algorithm. Examples of such techniques are set forth in Isard, et al., *CONDENSATION: Conditional Density Propagation for Visual Tracking*, International Journal of Computer Vision (IJCV) 29, 1998, 5-28; Cham, et al., *A Multiple Hypothesis Approach to Figure Tracking*, Proc. IEEE Conf. on Computer Vision and Pattern Recognition (CVPR), 1999, 239-245; Toyama, et al., *Probabilistic Tracking in a Metric Space*, Proc. IEEE International Conf. on Computer Vision (ICCV), 2001, 5057; Sidenbladh, et al., *Stochastic Tracking of 3D Human Figures Using 2D Image Motion*, Proc. European Conf. on Computer Vision (ECCV), 2000, 702-718; Siedenbladh, et al., *Learning Image Statistics for Bayesian Tracking*, Proc. ICCV, 2001, 709-716; Elgammal, et al., *Inferring 3D Body Pose From Silhouettes Using Activity Manifold Learning*, CVPR, 2004, 681-688; Grochow, et al., *Style-based Inverse Kinematics*, ACM Computer Graphics (SIGGRAPH), 2004, 522-531; Safonova, et al., *Synthesized Physically Realistic Human Motion in Low Dimensional Behavior Specific Spaces*, SIGGRAPH, 2004, 514-521; Sminchisescu, et al., *Generative Modeling for Continuous Non-linearly Embedded Visual Inference*, Proc. IEEE International Conf. on Machine Learning, 2004,140-147; Tian, et al., *Tracking Human Body Pose on a Learned Smooth Space*, Technical Report 2005-029, Boston University, 2005; and Urtasun, et al. *Priors for People Tracking from Small Training Sets*, Proc. IEEE International Conf. on Computer Vision, 2005, 403-410 which are all incorporated by reference herein in their entirety.

The modes of this multiple hypothesis tracker are propagated over time in the embedded space. In the application to 3D articulated human tracking, at each time instance, the tracker state vector is represented by $X_t=(P_t, g_t)$. $P_t$ is the 3D location of the pelvis (which is the root of the kinematic chain of the 3D human model) and $g_t$ is the point in latent space. Once the tracker state has been initialized, a filtering based tracking algorithm maintains a time-evolving probability distribution over the tracker state. Let $Z_t$ denote the aggregation of past image observations (i.e. $Z_t=\{z_1, z_2, \ldots, z_t\}$). Assuming $z_t$ is independent of $Z_{t-1}$ given $X_t$, the following standard equation applies:

$$p(X_t|Z_t) \propto p(z_t|X_t)p(X_t|Z_{t-1}) \quad (11)$$

A multiple hypothesis tracker (MHT) together with the learned LLC model provides the 3D motion tracker. As LLC provides clusters in the latent space as a step in the global coordination, it is natural to make use of the centers of the clusters as the initial modes in the MHT ($p(g|z_s, s)$ follows a Gaussian distribution). Given that in each cluster, the points in the latent space represent the poses that are similar to each other in the original space, a simple dynamic model may be applied in the prediction step of the filtering algorithm. In one embodiment, the modes are passed through a simple constant velocity predictor in the latent space. In another embodiment, the dynamic model is not used.

FIG. 3b summarizes one embodiment of the online tracking method 220. The pose state at the next time frame is predicted 322 based on the prediction model 215. In one embodiment, this prediction generates several of the most likely pose states based on the prediction model. The 2D image corresponding to the predicted time frame is then received 324 from a video sequence. The predicted pose state is then updated 326 based on the 2D image information. In one embodiment, this update comprises selecting the pose state of the several predicted possible pose states that best matches the data in the 2D image. The time frame advances 328 and the process repeats for each frame of 2D video.

Figure 7:
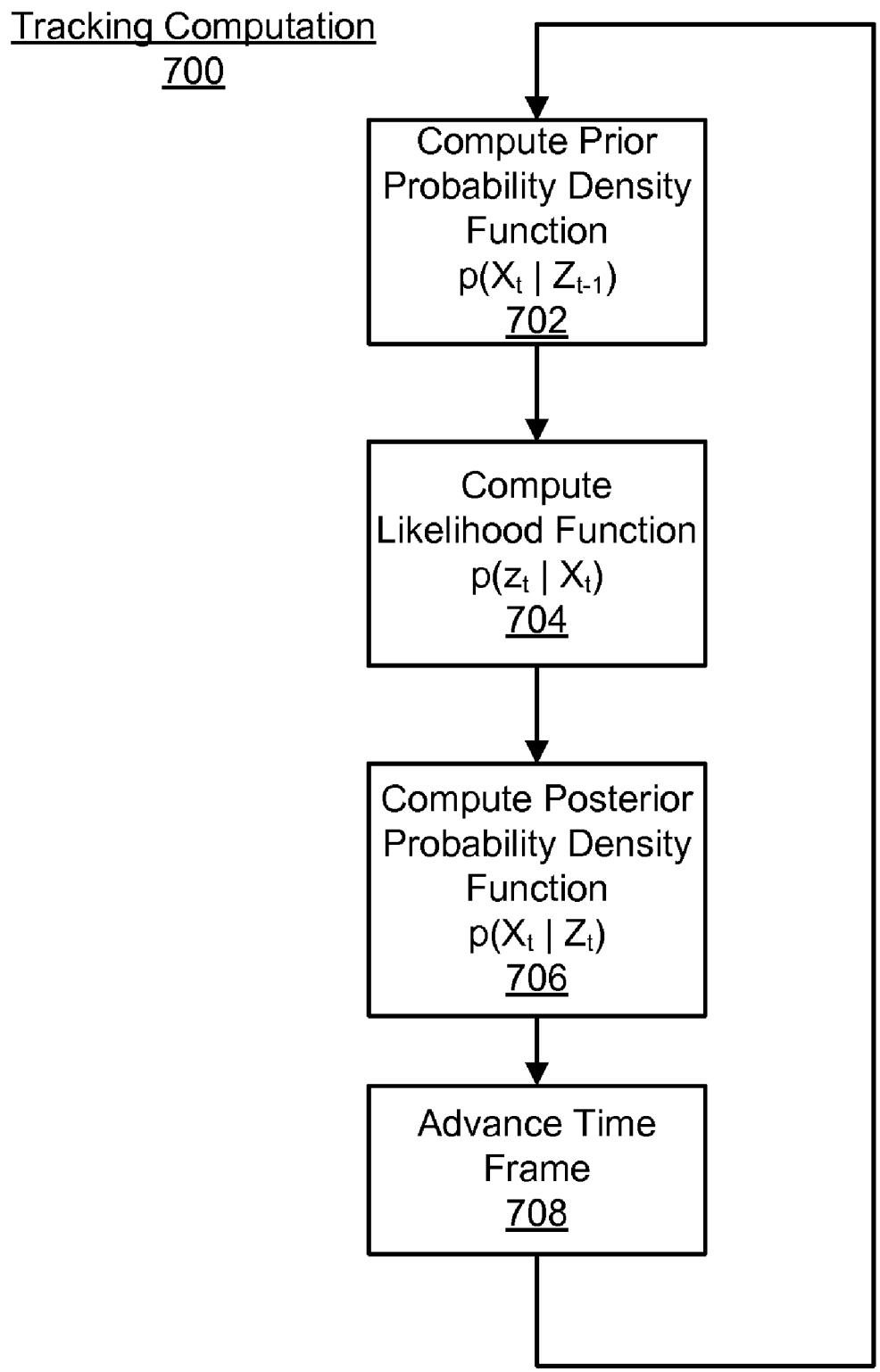
FIG. 7 is a flow diagram illustrating the computation performed during online tracking according to one embodiment of the present invention.

FIG. 7 summarizes the computations performed in the online tracking stage 220. A prior probability density function is computed 702. This function is based on the prediction model 215 and all past image observations. In one embodiment, the modes of the prior probability density function are passed through a simple constant velocity predictor to predict 322 the pose state at the next time frame. In equation 11, the prior probability density function is represented by $p(X_t|Z_{t-1})$.

The likelihood function is computed 704 based on receiving the 2D image from the 2D image sequence 324. In order to compute the likelihood for the current prediction and the input video frame, the silhouette of the current video frame is extracted through background subtraction. The predicted model is then projected onto the image and the chamfer matching cost between the projected model and the image silhouettes is considered to be proportional to the negative log-likelihood. In one embodiment, the projected model consists of a group of cylinders as described by Sigal, et al., *Tracking Loose-limbed People.*, CVPR, 2004, 421-428. By computing the matching cost of the samples and measuring the local statistics associated with each likelihood mode, the predicted pose state is updated 326. In equation 11, the likelihood function is represented by $p(z_t|X_t)$.

The posterior probability density function is computed 706 through equation 11, where the posterior probability density function is represented by $p(X_t|Z_t)$. The time frame advances 708 and the calculation is repeated for each time frame of video.

The MHT algorithm proposed here differs from conventional techniques in a variety of ways. For example, the present invention uses the latent space to generate proposals in a principled way. This is in contrast with conventional techniques, where the modes are selected empirically and the distributions are assumed to be piecewise Gaussian. While in the proposed algorithm, the output from the off-line learning algorithm (LLC) forms clusters (each cluster is described by a Gaussian distribution in latent space), the samples generated from the latent space are indeed drawn from a piecewise Gaussian distribution. The choice of modes to propagate over time becomes straightforward given the statistics of the clusters in the latent space.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for tracking three-dimensional (3D) motion of a subject comprising the steps of:

receiving a two-dimensional (2D) image sequence;

receiving a prediction model learned in an offline learning process, the prediction model specifying a mapping of pose information of the subject between a high dimensional pose space and a low dimensional pose space, the high dimensional pose space having a higher dimensionality than the low dimensional pose space;

generating, in the low dimensional pose space, a predicted pose state of the subject based on the prediction model; and generating 3D tracking data to track the motion in the high dimensional pose space based at least in part on the predicted pose state and the 2D image sequence;

wherein the offline learning process comprises steps of:

capturing 3D motion data;

processing the 3D motion data to extract training pose information;

learning a dimensionality reduction model based on the extracted training pose information adapted to bidirectionally map the pose training information from the high dimensional pose space to the low dimensional pose space; and generating the prediction model based at least in part on the dimensionality reduction model.

2. The method of claim 1 wherein learning the dimensionality reduction model includes forming clusters in the low dimensional pose space and modeling the clusters in the low dimensional pose space as Gaussian distributions.

3. The method of claim 1 wherein learning the dimensionality reduction model comprises steps of:
- computing local non-linear reconstruction weights to locally approximate a first pose state representation represented using the high dimensional space;
- training a mixture of factor analyzers to locally reduce the dimensionality of the first pose state representation to form a second pose state representation represented using a locally coordinated low dimensional space;
- determining a set of alignment parameters to map between the locally coordinated low dimensional space and a globally coordinated low dimensional space; and
- determining a third pose state representation represented using a globally coordinated low dimensional space based on the second pose state representation and the alignment parameters.

4. The method of claim 1 wherein learning the dimensionality reduction model includes applying a Gaussian Process Latent Variable Model (GPLVM) algorithm.

5. The method of claim 1 wherein learning the dimensionality reduction model includes applying an Locally Linear Coordination (LLC) algorithm.

6. The method of claim 1 wherein the prediction model is further based on a learned dynamic model for at least one motion to be tracked.

7. The method of claim 1 wherein the training pose information includes a vector of joint angles.

8. A system for tracking three-dimensional (3D) motion of a subject comprising:
- image receiving means for receiving a two-dimensional (2D) image sequence;
- model receiving means for receiving a prediction model learned from offline learning means, the prediction model specifying a mapping of pose information of the subject between a high dimensional pose space and a low dimensional pose space, the high dimensional pose space having a higher dimensionality than the low dimensional pose space;
- pose prediction means for generating, in the low dimensional pose space, a predicted pose state of the subject based on the prediction model; and
- tracking means for generating 3D tracking data to track the motion in the high dimensional pose space based at least in part on the predicted pose state and the 2D image sequence;
- wherein the offline learning means comprises:
  - 3D capture means for capturing 3D motion data;
  - processing means for processing the 3D motion data to extract training pose information;
  - model learning means for learning a dimensionality reduction model based on the extracted training pose information adapted to bidirectionally map the pose training information from the high dimensional pose space to the low dimensional pose space; and
  - prediction model generating means for generating the prediction model based at least in part on the dimensionality reduction model.

9. The system of claim 8 wherein the model learning means for learning the dimensionality reduction model includes clustering means for forming clusters in the low dimensional pose space and modeling the clusters in the low dimensional pose space as Gaussian distributions.

10. The system of claim 8 wherein the model learning means comprises:
- local approximation means for computing local non-linear reconstruction weights to locally approximate a first pose state representation represented using the high dimensional space;
- local dimensionality reduction means for training a mixture of factor analyzers to locally reduce the dimensionality of the first pose state representation to form a second pose state representation represented using a locally coordinated low dimensional space;
- alignment parameters determining means for determining a set of alignment parameters to map between the locally coordinated low dimensional space and a globally coordinated low dimensional space; and
- global coordination means for determining a third pose state representation represented using a globally coordinated low dimensional space based on the second pose state representation and the alignment parameters.

11. The system of claim 8 wherein the model learning means for learning the dimensionality reduction model includes Gaussian Process Latent Variable Model (GPLVM) means for applying a GPLVM algorithm.

12. The system of claim 8 wherein the model learning means for learning the dimensionality reduction model includes Local Linear Coordination (LLC) means for applying a Locally Linear Coordination (LLC) algorithm.

13. The system of claim 8 wherein the prediction model is further based on a learned dynamic model for at least one motion to be tracked.

14. The system of claim 8 wherein the training pose information includes a vector of joint angles.

15. A computer program product, comprising a computer readable medium storing computer executable code for tracking three-dimensional (3D) motion of a subject, the computer executable code when executed causing a computer to perform the steps of:
- receiving a two-dimensional (2D) image sequence;
- receiving a prediction model learned in an offline learning process, the prediction model specifying a mapping of pose information of the subject between a high dimensional pose space and a low dimensional pose space, the high dimensional pose space having a higher dimensionality than the low dimensional pose space;
- generating, in the low dimensional pose space, a predicted pose state of the subject based on the prediction model; and
- generating 3D tracking data to track the motion in the high dimensional pose space based at least in part on the predicted pose state and the 2D image sequence;
- wherein the offline learning process comprises steps of:
  - capturing 3D motion data;
  - processing the 3D motion data to extract training pose information;
  - learning a dimensionality reduction model based on the extracted training pose information adapted to bidirectionally map the pose training information from the high dimensional pose space to the low dimensional pose space; and
- generating the prediction model based at least in part on the dimensionality reduction model.

16. A method for tracking three-dimensional (3D) motion of a subject comprising the steps of:
- receiving a two-dimensional (2D) image sequence;
- receiving a prediction model learned in an offline learning process, the prediction model specifying a mapping of pose information of the subject between a high dimensional pose space and a low dimensional pose space, the high dimensional pose space having a higher dimensionality than the low dimensional pose space;

generating, in the low dimensional pose space, a predicted pose state of the subject based on the prediction model; and generating 3D tracking data to track the motion in the high dimensional pose space based at least in part on the predicted pose state and the 2D image sequence;

wherein generating 3D tracking data comprises:

generating a prior probability density function based on the prediction model and at least one previous 2D image in the image sequence;

generating a likelihood function based on a matching cost between the predicted pose state and the current 2D image; and generating a posterior probability density function based on the prior probability density function and the likelihood function.

17. The method of claim 16, wherein generating 3D tracking data comprises steps of:

receiving a current 2D image from the 2D image sequence; and updating the predicted pose state based at least in part on the current 2D image.

18. The method of claim 17, wherein updating the predicted pose state comprises selecting an optimal pose state that best matches the current 2D image.

19. A computer program product comprising a computer readable medium storing computer executable code for tracking three-dimensional (3D) motion of a subject, the computer executable code when executed causing a computer to perform the steps of:

receiving a two-dimensional (2D) image sequence;

receiving a prediction model learned in an offline learning process, the prediction model specifying a mapping of pose information of the subject between a high dimensional pose space and a low dimensional pose space, the high dimensional pose space having a higher dimensionality than the low dimensional pose space, generating, in the low dimensional pose space, a predicted pose state of the subject based on the prediction model; and generating 3D tracking data to track the motion in the high dimensional pose space based at least in part on the predicted pose state and the 2D image sequence;

wherein generating 3D tracking data comprises:

generating a prior probability density function based on the prediction model and at least one previous 2D image in the image sequence;

generating a likelihood function based on a matching cost between the predicted pose state and the current 2D image; and generating a posterior probability density function based on the prior probability density function and the likelihood function.

20. The computer program product of claim 19, wherein generating 3D tracking data comprises the steps of:

receiving a current 2D image from the 2D image sequence; and updating the predicted pose state based at least in part on the current 2D image.

21. The computer program product of claim 20, wherein updating the predicted pose state comprises selecting an optimal pose state that best matches the current 2D image.

22. A method for learning a prediction model for three-dimensional (3D) human motion tracking, the method comprising the steps of:

capturing 3D motion data;

processing the 3D motion data to extract pose information;

learning a dimensionality reduction model based on the extracted pose information adapted to bidirectionally map the pose information from the high dimensional space to the low dimensional space; and generating a prediction model based at least in part on the dimensionality reduction model.

23. The method of claim 22, wherein learning the dimensionality reduction model includes forming clusters in the low dimensional space and modeling the clusters in the low dimensional space as Gaussian distributions.

24. The method of claim 22, wherein learning the dimensionality model comprises the steps of:

computing local non-linear reconstruction weights to locally approximate a first pose state representation represented using the high dimensional space;

training a mixture of factor analyzers to locally reduce the dimensionality of the first pose state representation to form a second pose state representation represented using a locally coordinated low dimensional space;

determining a set of alignment parameters to map between the locally coordinated low dimensional space and a globally coordinated low dimensional space; and determining a third pose state representation represented using a globally coordinated low dimensional space based on the second pose state representation and the alignment parameters.

25. A computer program product, comprising a computer readable medium storing computer executable code for learning a prediction model for three-dimensional human motion tracking, the computer executable code when executed causing a computer to perform the steps of:

capturing 3D motion data;

processing the 3D motion data to extract pose information;

learning a dimensionality reduction model based on the extracted pose information adapted to bidirectionally map the pose information from the high dimensional space to the low dimensional space; and generating a prediction model based at least in part on the dimensionality reduction model.

26. The computer program product of claim 25, wherein learning the dimensionality reduction model includes forming clusters in the low dimensional space and modeling the clusters in the low dimensional space as Gaussian distributions.

27. The computer program product of claim 25, wherein learning the dimensionality model comprises the steps of:

computing local non-linear reconstruction weights to locally approximate a first pose state representation represented using the high dimensional space;

training a mixture of factor analyzers to locally reduce the dimensionality of the first pose state representation to form a second pose state representation represented using a locally coordinated low dimensional space;

determining a set of alignment parameters to map between the locally coordinated low dimensional space and a globally coordinated low dimensional space; and determining a third pose state representation represented using a globally coordinated low dimensional space based on the second pose state representation and the alignment parameters.

* * * * *